United States Patent
Ohno

(10) Patent No.: US 6,600,610 B2
(45) Date of Patent: Jul. 29, 2003

(54) STANDARD PHOTOGRAPHIC LENS

(75) Inventor: Kazunori Ohno, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 9 days.

(21) Appl. No.: 10/083,133

(22) Filed: Feb. 27, 2002

(65) Prior Publication Data

US 2003/0048543 A1 Mar. 13, 2003

(30) Foreign Application Priority Data

Mar. 28, 2001 (JP) ........................... 2001-093521

(51) Int. Cl.[7] ................................................. G02B 9/60
(52) U.S. Cl. ......................... 359/770; 359/740; 359/753
(58) Field of Search ............................... 359/754–756, 359/761, 763, 770, 739–740, 749–753, 680–682, 691

(56) References Cited

U.S. PATENT DOCUMENTS 4,747,676 A * 5/1988 Hirakawa ................... 359/751

6,222,685 B1 * 4/2001 Yamada ..................... 359/770

FOREIGN PATENT DOCUMENTS

| JP | 60-95416 | * | 5/1985 |
| JP | 5-45583 | * | 2/1993 |
| JP | 5-173062 | | 7/1993 |
| JP | 7-18972 | | 3/1995 |

* cited by examiner

Primary Examiner—Jordan M. Schwartz
(74) Attorney, Agent, or Firm—Arnold International; Bruce Y. Arnold

(57) ABSTRACT

A standard photographic lens is disclosed that includes a front lens group, a diaphragm stop, and a rear lens group, in order from the object side. The front lens group is formed of a negative meniscus lens with its convex surface on the object side, and a positive meniscus lens with its convex surface on the object side. The rear lens group is formed of a third lens element of negative refractive power with a concave surface on the object side, a fourth lens element of positive refractive power with a convex surface on the image side, and a fifth lens element, of meniscus shape with its concave surface on the image side. Organic material is preferably used for the second and third lens elements. Various conditions are satisfied so as to provide a lens having a bright image with favorably corrected aberrations.

4 Claims, 3 Drawing Sheets

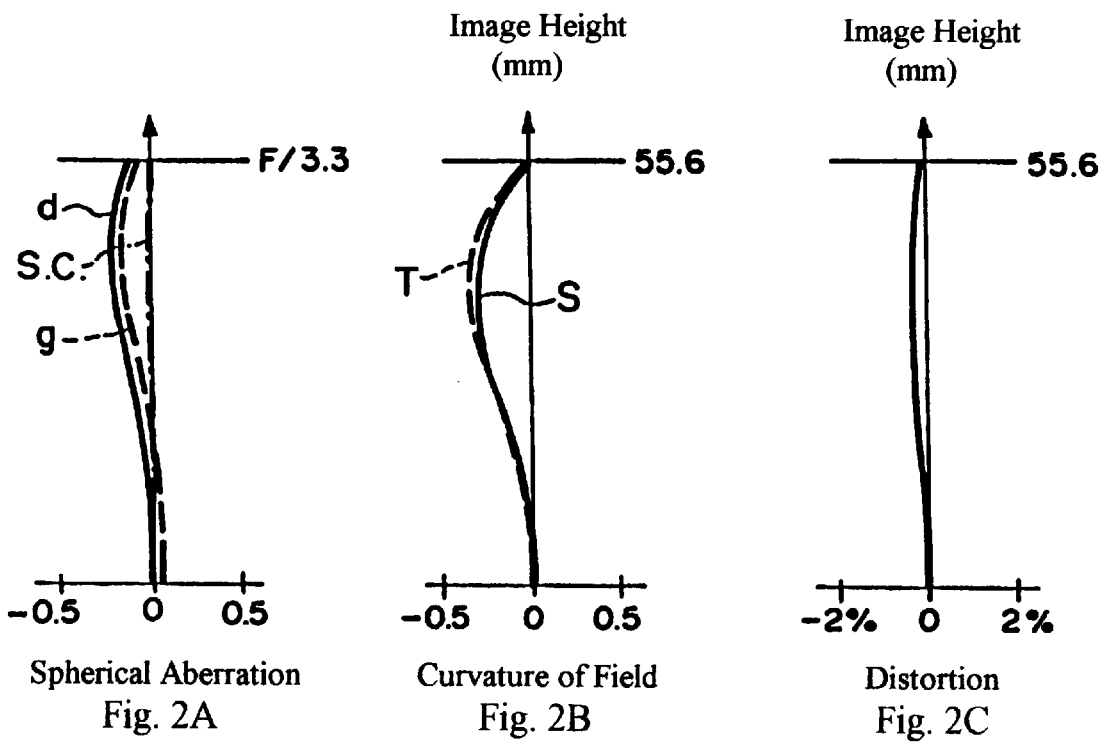
Fig. 2A Spherical Aberration
Fig. 2B Curvature of Field
Fig. 2C Distortion
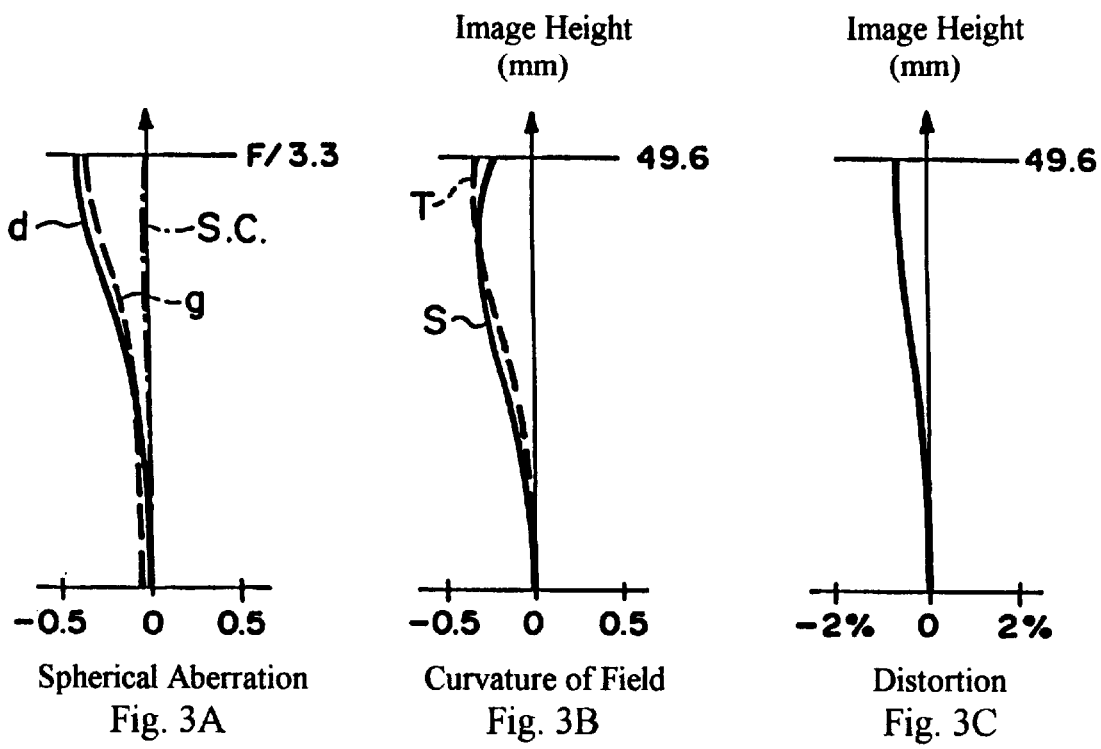
Fig. 3A Spherical Aberration
Fig. 3B Curvature of Field
Fig. 3C Distortion Spherical Aberration Curvature of Field Distortion Spherical Aberration Curvature of Field Distortion

STANDARD PHOTOGRAPHIC LENS

BACKGROUND OF THE INVENTION

In the past, the well-known Gauss-type lens has been widely used as a photographic lens. Such a lens provides a standard field of view while providing a bright image. Today, Gauss-type lenses are used for various purposes and they provide advantages such as a bright image, high optical performance, and low cost of production.

A lens for use in a single lens reflex camera requires a longer back focus than a lens for use with a compact camera. Therefore, compared with the lenses used in conventional compact cameras, Gauss-type lenses provide a slightly more narrow field of view (i.e., picture angle). As a result, in some cases, such as taking a photograph indoors, it is impossible to take a photograph that encompasses a wide-angle of view, and thus there is some dissatisfaction if a Gauss-type lens is used as the standard lens of a photographic camera.

Generally speaking, if one wishes to take a photograph that encompasses a wide-angle of view, a standard lens is replaced with a wide-angle lens. However, this is often inconvenient due to the time needed to change lenses. Therefore, there has been increasing demand for using a zoom lens which can work from a standard angle to a wide-angle. However, there is a disadvantage in that carrying a zoom lens is somewhat inconvenient because of its larger size. In addition, zoom lenses tend to be more expensive.

Furthermore, many zoom lenses as well as standard lenses and wide-angle lense are unsatisfactory due to insufficient imaging performance caused by curvature of field or distortion at peripheral field angles. In order to provide a lens having a wider field of view, a lens having negative refractive power may be provided on the object side of a Gauss-type lens system. Such a construction allows the lens to have a wide-angle of view while simultaneously providing a long back focus. In this way a Gauss-type lens can be used for the lens system of a single lens reflex camera having a wide viewing field.

Japanese Examined Patent Publication H7-18972 discloses placing a negative lens group on the object side of a Gauss-type master lens wherein the spacings between the lens elements may be varied in order to provide a zoom lens with improved imaging performance at the near end of the zooming range. However, this lens system is formed of many lens elements, and thus is somewhat expensive to produce. In addition, the field angle of this lens is somewhat narrow.

For a compact camera, Japanese Patent Publication No. 3082385 discloses a lens system which has a lens with negative refractive power positioned on the object side of the lens system. However, this lens system is not usable for a single lens reflex camera because the back focus is too short, since this lens system was designed for a compact camera.

BRIEF SUMMARY OF THE INVENTION

The present invention is a photographic lens for use in a single lens reflex camera. The objects of the invention are to provide a lens of simple construction that is inexpensive to produce, to provide a high quality image, and to provide both a large back focus and a field of view that is slightly larger than the standard field of view. More specifically, the present invention is a high performance standard photographic lens wherein a lens having negative refractive power is positioned on the object side of a master lens having positive refractive power in order to provide a lens having a large back focus. Spherical aberration, curvature of field, and distortion are favorably corrected so as to provide images of high quality.

BRIEF DESCRIPTION OF THE DRAWINGS

The present invention will become more fully understood from the detailed description given below and the accompanying drawings, which are given by way of illustration only and thus are not limitative of the present invention, wherein:

FIGS. 2A–2C show the spherical aberration, curvature of field, and distortion, respectively, of Embodiment 1 of the present invention;

FIGS. 3A–3C show the spherical aberration, curvature of field, and distortion, respectively, of Embodiment 2 of the present invention;

DETAILED DESCRIPTION

Figure 1:
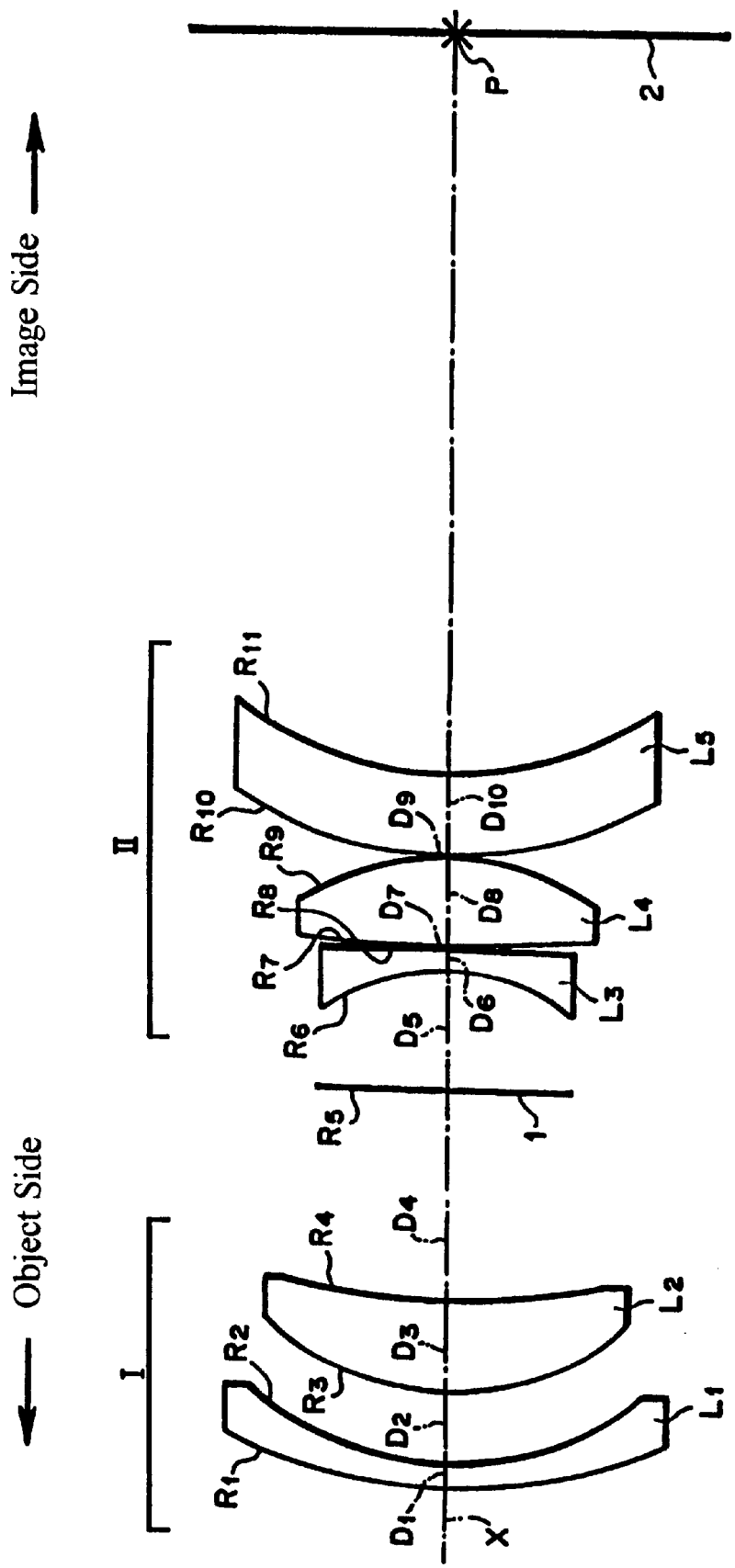
FIG. 1 shows the basic lens element configuration of Embodiment 1 of the present invention.

A photographic lens having a standard field angle is provided that is formed of, in order from the object side, a front lens group, a diaphragm to regulate image brightness, and a rear lens group. The front lens group is formed of, in order from the object side, a first lens element that has negative refractive power and a meniscus shape with its convex surface on the object side, and a second lens element that has positive refractive power and a meniscus shape with its convex surface on the object side. The rear lens group is formed of, in order from the object side, a third lens element of negative refractive power and having a concave surface of strong refractive power on the object side, a fourth lens element of positive refractive power and having a convex surface of strong refractive power on the image side, and a fifth lens element, of meniscus shape with its concave surface on the image side. In addition, the following Conditions (1)–(8) are satisfied:

| | |
|---|---|
| $0.75 < L/f < 1.0$ | Condition (1) |
| $2.70 < f_F/f < 4.0$ | Condition (2) |
| $0.60 < f_2/f < 1.0$ | Condition (3) |
| $0.33 < f_4/f < 0.43$ | Condition (4) |
| $0.25 < R_2/f < 0.40$ | Condition (5) |
| $0.25 < R_{11}/f < 0.45$ | Condition (6) |
| $0.02 < D_2/f < 0.12$ | Condition (7) |
| $v > 50.0$ | Condition (8) | where

L is the back focus, f is the focal length of the standard photographic lens, $f_F$ is the focal length of the front lens group, in order from the object side, $f_2$ is the focal length of the second lens element, in order from the object side, $f_4$ is the focal length of the fourth lens element, in order from the object side, R$_2$ is the radius of curvature of the surface of the first lens element, in order from the object side, that is on the image side, R$_{11}$ is the radius of curvature of the surface of the fifth lens element, in order from the object side, that is on the image side, D$_2$ is the on-axis spacing between the first lens element and the second lens element, in order from the object side, and $\upsilon_1$ is the Abbe number of the material which forms the first lens element, in order from the object side.

In the standard photographic lens of the present invention, a required amount of back focus can be provided by having the first lens element on the object side be of negative refractive power, and by having the last lens element be a meniscus lens of weak refractive power with its convex surface being of strong refractive power and on the object side and with its concave surface being of strong refractive power and on the image side. By using a diaphragm somewhat symmetrically positioned between the second and third lens elements, in order from the object side, various aberrations caused by asymmetry, such as distortion, coma and lateral color can be minimized while enabling the brightness of the image to be controlled.

By satisfying certain required conditions which optimize the power distribution between the lens elements, the present invention can provide a high performance over the entire image field. In such a standard photographic lens, the third lens element, in order from the object side, should be made of organic material so that at least one surface thereof can be easily manufactured as an aspheric surface. Such a construction allows one to improve the performance of the lens while, by optimizing the manufacturing process, keeping the costs low.

Organic materials, such as acrylics, which have small Abbe numbers also have small refractive indexes as compared with glass materials. Therefore, using an organic material for the material of the third lens element of negative refractive power can make the Petzval sum small. As a result, the field curvature is minimized, and the optical performance of the standard photographic lens of the invention is improved.

If organic material is used to make the third lens element, the required radius of curvature must be smaller than if optical glass is used, causing more negative spherical aberration to be generated. However, because organic material surfaces can easily and inexpensively be made aspheric so as to correct this effect, the increased spherical aberration can be balanced by the aspherical surface.

In the standard photographic lens of the invention, the second lens element, in order from the object side, is preferably made of organic material. Such a construction allows further promotion of cost reduction and improved weather resistance. In organic materials, changes in temperature and humidity greatly affect the index of refraction. Thus, there is a potential problem in that this may degrade the image quality. However, by using organic materials for both the second lens element and the third lens element, but not the first lens element in order from the object side, this problem is minimized. Also, at least one surface of the second lens element is preferably aspheric. Such construction allows for increased freedom in design and enables a higher optical performance to be achieved.

The standard photographic lens of the invention will first be discussed in general terms with reference to a drawing figure. FIG. 1 shows the basic lens element configuration according to an embodiment of the invention. As shown in FIG. 1, the standard photographic lens is composed of a front lens group I, a diaphragm 1, and a rear lens group II, in order from the object side. Light traveling along the optical axis X from the object side is imaged by the lens onto the surface 2 positioned at the point P along the optical axis.

The front lens group is formed of, in order from the object side, a first lens element L$_1$ which is a negative meniscus lens with its convex surface on the object side, and a second lens element L$_2$, which is a positive meniscus lens with its concave surface on the object side.

The rear lens group is formed of the following, in order from the object side, a third lens element L$_3$, which is a negative meniscus lens with its concave surface of strong refractive power and on the object side, a fourth lens element lens L$_4$, which is a biconvex lens with its convex surface of strong refractive power and on the image side, and a fifth lens element L$_5$, which is a negative meniscus lens with its concave surface on the image side.

Organic materials such as acrylics are preferably used to make the second lens element and the third lens element. At least one surface of the second and third lens elements should be an aspheric surface with a shape defined by the following Equation (A):

$$Z(h) = Ch^2/\{1+(1-KC^2h^2)^{1/2}\} + A_4 h^4 + A_6 h^6 + A_8 h^8 + A_{10} h^{10} \qquad \text{Equation (A)}$$

where

Z is the length (in mm) of a line drawn from a point on the aspherical surface at distance h from the optical axis to the tangential plane of the aspherical surface vertex, C (=1/R) is the curvature of the aspherical surface near the optical axis, h is the distance (in mm) from the optical axis, K is the eccentricity, and $A_4$, $A_6$, $A_8$, and $A_{10}$ are the 4th, 6th, 8th, and 10th aspherical coefficients.

Further, the above Conditions (1)–(8) should be satisfied.

The purpose of these conditions will now be discussed. Condition (1) specifies the ratio of the back focus divided by the focal length of the standard photographic lens of the invention. A lens for use in a single lens reflex camera must have a large back focus in order to accommodate the quick-return mirror that switches the light path in such cameras. By satisfying Condition (1) a field angle is provided by the lens of the present invention that is slightly wider than normally used. If the lower limit of Condition (1), is not satisfied, the required back focus for a single lens reflex camera cannot be secured without increasing the focal length. This, however, would make the angle of view more narrow than is standard. On the other hand, if the upper limit of Condition (1) is not satisfied, the image quality at the periphery of the field of view deteriorates. Also the size of the standard photographic lens will become excessive, making it unsuitable for use as a standard photographic lens.

Condition (2) specifies the ratio of the focal length of the front lens group I, composed of the first lens element L$_1$ and the second lens element L$_2$ divided by the overall focal length of the standard photographic lens of the invention.

In the present invention, negative refractive power is required in the first lens element L$_1$ to some extent to keep the back focus of the entire system greater than a specified amount. Therefore, by keeping the focal length of the front lens group within the range specified by Condition (2), the distribution of refractive powers of the front and rear lens groups is optimized so that a high image quality is maintained even in the peripheral areas of the image. If the lower limit of Condition (2) is not satisfied, the refractive power of the second lens element L$_2$ will be excessive, causing the spherical aberration and curvature of field to be excessive. As a countermeasure, it is possible to use a material having a high index of refraction for the second lens element $L_2$ or, alternatively, to use two lens elements instead of one lens element so as to reduce spherical aberration and curvature of field. However, after such countermeasures, in order to correct the chromatic aberration, it is necessary to use materials having a relatively small Abbe number for the material of the first lens element $L_1$. This will not allow correction for lateral color in the most peripheral areas of the image, and thus will result in a deterioration in image quality. On the other hand, if the upper limit of Condition (2) is not satisfied, as the refractive power of front lens group becomes less, it will be necessary to intensify the refractive power of the rear lens group. Therefore, the symmetrical distribution of refractive power of the entire system for abaxial light flux will be impaired and the quality of the image in peripheral areas will decrease.

Condition (3) specifies the ratio of the focal length of the second lens element divided by that of the standard photographic lens of the invention. If the lower limit of Condition (3) is not satisfied, in order to correct the situation it will be necessary to either increaese the negative refractive power of the first lens element $L_1$ or to increase the spacing $D_2$ between the first lens element $L_1$ and the second lens element $L_2$. However, as these counter measures will cause the curvature of field, distortion and lateral color to increase, it will be necessary, for example, to strengthen the negative refractive power of the fifth lens element $L_5$ of the rear lens group II to correct these aberrations. Then, it will be necessary to strengthen the positive refractive power of the fourth lens element $L_4$ in order to maintain a balanced distribution of refractive powers. As a result, the spherical aberration and curvature of field that this produces will cause the image quality to degrade. On the other hand, if the upper limit of Condition (3) is not satisfied the focal length of the second lens element $f_2$ is too large relative to the focal length of the overall system. In order to correct the resulting weaker refractive power of the front lens group, it becomes necessary to strengthen the refractive power of the rear lens group. Therefore, a symmetrical distribution of refractive powers of the entire lens system for abaxial light flux is impaired and the image quality in peripheral areas of the image deteriorates.

Condition (4) specifies the ratio of the focal length of the fourth lens element $L_4$, which has the strongest positive refractive power of any lens element in the entire system, divided by the focal length of the standard photographic lens of the invention. If the lower limit of Condition (4) is not satisfied, spherical aberration becomes excessive. This could be corrected by strengthening the negative refractive power of the third lens element $L_3$, for instance. However, for correction of chromatic aberrations, it is necessary to use a lens made up of material having a small Abbe number. If a lens material with high refractive power is used, the Petzval sum becomes greater and the curvature of field will increase. Even though organic material with a smaller Abbe number is available on the market, if such a material is used and the lens is made to include an aspheric surface, the positive refractive power of the fourth lens element $L_4$ is too strong to correct the curvature of field and lateral color. On the other hand, if the upper limit of Condition (4) is not satisfied, the positive refractive power of the fourth lens element $L_4$ becomes impaired, and this limits the negative refractive power that the third lens element can have. Further, as it then becomes necessary to increase the positive refractive power of the second lens element $L_2$ in order to maintain the focal length of the entire system, this makes the length of back focus short, which is undesirable. To avoid this, one could instead increase the outer diameter of the lens elements in the rear lens group, however, this would make lens larger and heavier, thus degrading portability of the lens.

Conditions (5) and (6) specify the ratio of the radius of curvature $R_2$ of the second surface, in order from the object side (i.e., that of the image side of the first lens element $L_1$), divided by the focal length f of the standard photographic lens, and the ratio of the radius of curvature $R_{11}$ of the eleventh surface, in order from the object side (i.e., that of the image side of the fifth lens element $L_5$), divided by the focal length f of the standard photographic lens, respectively. These conditions have a strong relationship, in terms of symmetry, with regard to the aberrations of the abaxial light flux. Namely, the smaller the value of $R_2$, the stronger the negative refractive power, which results in increased curvature of field in the negative direction as well as increased negative distortion; and, the smaller the value of $R_{11}$, the stronger the positive refractive power for the abaxial light flux, and curvature of field in the positive direction and positive distortion result. Therefore, by making $R_2$ and $R_{11}$ change in the same direction the curvature of field and distortion can be balanced out. If the lower limits of Conditions (5) and (6) are not satisfied, spherical aberration and coma become excessive, and the quality of the image is degraded. On the other hand, if the upper limits of Conditions (5) and (6) are exceeded, excessive spherical aberration will be generated at the second lens element $L_2$ and the fourth lens element $L_4$.

Condition (7) specifies the ratio of the on-axis spacing between the first lens element $L_1$ and the second lens element $L_2$ divided by the focal length of the standard photographic lens of the invention. By having the first lens element $L_1$ be of negative refractive power, aberrations can be favorably corrected and the back focus of the standard photographic lens can be kept within a fixed range. If the lower limit of Condition (7) is not satisfied, in order to satisfy Conditions (2) and (3), it is necessary to strengthen the negative refractive power of the first lens element $L_1$. As a result, this increases the lateral color in the periphery of the image field. On the other hand, if the upper limit of Condition (7) is not satisfied, the negative refractive power of the first lens element becomes too small, resulting in enlargement of Petzval sum and thus increasing the curvature of field.

Condition (8) specifies the Abbe number of the first lens element in order to enable the first lens element to properly correct for chromatic aberrations in the first lens element $L_1$ and the second lens element $L_2$. If Condition (8) is not satisfied, lateral color in the periphery of the image field will be excessive unless materials with smaller Abbe number are used as the lens material for the second lens element $L_2$. As a result, to correct for chromatic aberrations, the positive refractive power of the second lens element $L_2$ must be intensified. This will result in an increase in manufacturing costs.

Several embodiments of the invention will now be described in detail. The basic lens element configuration of the standard photographic lens according to each embodiment is illustrated in FIG. 1.

Embodiment 1

Table 1 below lists the surface number # in order from the object side, the radius of curvature R (in mm) of each surface, the on-axis spacing D (in mm) between surfaces, as well as the index of refraction $N_d$ and Abbe number $\upsilon_d$ (both at the d line) of each optical element of Embodiment 1. In the middle portion of the table are listed the focal length f of the standard photographic lens (normalized to 100 mm), the back focus L, the $F_{NO}$, and image angle 2ω of the standard photographic lens of this embodiment. In the bottom portion of the table are listed the values corresponding to Conditions (1)–(8).

TABLE 1

| # | R | D | $N_d$ | $v_d$ |
|---|---|---|---|---|
| 1 | 59.3458 | 2.5119 | 1.63854 | 55.4 |
| 2 | 34.1511 | 8.1368 | | |
| 3 | 30.4997 | 10.2124 | 1.49023 | 56.7 |
| 4 | 80.2878 | 23.9380 | | |
| 5 | ∞ (stop) | 12.5593 | | |
| 6* | −23.6408 | 2.7555 | 1.58364 | 30.3 |
| 7* | −732.0813 | 0.2713 | | |
| 8 | 275.4438 | 10.0474 | 1.77252 | 49.6 |
| 9 | −31.1175 | 0.4421 | | |
| 10 | 44.9519 | 9.4948 | 1.80236 | 47.2 |
| 11 | 39.4177 | | | |

$f = 100.00$    $L = 84.102$    $F_{NO} = 3.30$    $2\omega = 58.2°$

Condition (1) value: $L/f =$ 0.841
Condition (2) value: $f_F/f =$ 3.148
Condition (3) value: $f_2/f =$ 0.940
Condition (4) value: $f_4/f =$ 0.367
Condition (5) value: $R_2/f =$ 0.342
Condition (6) value: $R_{11}/f =$ 0.394
Condition (7) value: $D_2/f =$ 0.081
Condition (8) value: $v_1 =$ 55.4

Those surfaces with a * to the right of the surface number in Table 1 above are aspheric, with a shape defined by Equation (A) above. The aspheric coefficients for these surfaces are set forth in Table 2 below.

TABLE 2

| # | C | K | $A_4$ | $A_6$ | $A_8$ | $A_{10}$ |
|---|---|---|---|---|---|---|
| 6 | −0.0422996 | 1.375363 | $-9.7191 \times 10^{-8}$ | $-4.9404 \times 10^{-10}$ | $5.7848 \times 10^{-15}$ | $1.4460 \times 10^{-19}$ |
| 7 | −0.0013660 | 1.083701 | $3.2285 \times 10^{-6}$ | $-5.4738 \times 10^{-10}$ | $-6.6051 \times 10^{-15}$ | $1.0800 \times 10^{-18}$ |

As is apparent from comparing the values in the bottom portion of Table 1 with Conditions (1)–(8) above, each Condition is satisfied by the standard photographic lens of Embodiment 1.

FIGS. 2A–2C show the spherical aberration (in mm), curvature of field (in mm), and distortion, respectively, of the standard photographic lens of Embodiment 1. FIG. 2A shows the spherical aberration for both the d and g lines, and also illustrates the Sine Condition S.C. In FIG. 2B, the curvature of field is illustrated for both the sagittal S and tangential T image planes. As is apparent from these figures, each of the aberrations is favorably corrected for this embodiment.

Embodiment 2

Table 3 below lists the surface number # in order from the object side, the radius of curvature R (in mm) of each surface, the on-axis spacing D (in mm) between surfaces, as well as the index of refraction $N_d$ and Abbe number $v_d$ (both at the d line) of each optical element of Embodiment 2. In the middle portion of the table are listed the focal length f of the standard photographic lens (normalized to 100 mm), the back focus L, the $F_{NO}$, and image angle $2\omega$ of the standard photographic lens of this embodiment. In the bottom portion of the table are listed the values corresponding to Conditions (1)–(8).

TABLE 3

| # | R | D | $N_d$ | $v_d$ |
|---|---|---|---|---|
| 1 | 105.6816 | 2.6227 | 1.51823 | 59.0 |
| 2 | 35.2893 | 6.8540 | | |
| 3 | 33.0082 | 10.2677 | 1.49023 | 57.6 |
| 4 | 177.6108 | 24.9938 | | |
| 5 | ∞ (stop) | 13.1133 | | |
| 6* | −24.8240 | 3.9654 | 1.58364 | 30.3 |
| 7* | −1574.5450 | 0.1133 | | |
| 8 | 463.4045 | 10.2393 | 1.77250 | 49.6 |
| 9 | −31.6661 | 0.4616 | | |
| 10 | 41.3116 | 7.0812 | 1.71300 | 53.9 |
| 11 | 38.3090 | | | |

$f = 100.00$    $L = 91.412$    $F_{NO} = 3.30$    $2\omega = 53.1°$

Condition (1) value: $L/f =$ 0.914
Condition (2) value: $f_F/f =$ 3.079
Condition (3) value: $f_2/f =$ 0.808
Condition (4) value: $f_4/f =$ 0.387
Condition (5) value: $R_2/f =$ 0.353

TABLE 3-continued

Condition (6) value: $R_{11}/f =$ 0.383
Condition (7) value: $D_2/f =$ 0.069
Condition (8) value: $v_1 =$ 59.0

Those surfaces with a * to the right of the surface number in Table 3 above are aspheric, having a shape defined by Equation (A) above. The aspheric coefficients for these surfaces are set forth in Table 4 below.

TABLE 4

| # | C | K | $A_4$ | $A_6$ | $A_8$ | $A_{10}$ |
|---|---|---|---|---|---|---|
| 6 | −0.0402836 | 1.415708 | $-7.3900 \times 10^{-7}$ | $-3.7838 \times 10^{-10}$ | $4.5827 \times 10^{-15}$ | $1.0215 \times 10^{-19}$ |
| 7 | −0.0006350 | 1.079976 | $2.0370 \times 10^{-6}$ | $-4.3914 \times 10^{-10}$ | $-4.2004 \times 10^{-15}$ | $7.4006 \times 10^{-19}$ |

As is apparent from comparing the values in the bottom portion of Table 3 with Conditions (1)–(8) above, each condition is satisfied by the standard photographic lens of Embodiment 2.

FIGS. 3A–3C show the spherical aberration (in mm), curvature of field (in mm), and distortion, respectively, of the standard photographic lens of Embodiment 2. FIG. 3A shows the spherical aberration for both the d and g lines, and also illustrates the Sine Condition S.C. In FIG. 3B, the curvature of field is illustrated for both the sagittal S and tangential T image planes. As is apparent from these figures, each of the aberrations is favorably corrected for this embodiment.

Embodiment 3

Table 5 below lists the surface number # in order from the object side, the radius of curvature R (in mm) of each surface, the on-axis spacing D (in mm) between surfaces, as well as the index of refraction $N_d$ and Abbe number $\upsilon_d$ (both at the d line) of each optical element of Embodiment 3. In the middle portion of the table are listed the focal length f of the standard photographic lens (normalized to 100 mm), the back focus L, the $F_{NO}$, and image angle 2ω of the standard photographic lens of this embodiment. In the bottom portion of the table are listed the values corresponding to Conditions (1)–(8).

TABLE 5

| # | R | D | $N_d$ | $\upsilon_d$ |
|---|---|---|---|---|
| 1 | 172.1359 | 2.5584 | 1.51823 | 59.0 |
| 2 | 32.0124 | 3.3381 | | |
| 3* | 28.9296 | 10.0158 | 1.49023 | 57.6 |
| 4* | 343.9777 | 24.3806 | | |
| 5 | ∞ (stop) | 12.7916 | | |
| 6* | −24.2396 | 2.8005 | 1.58364 | 30.3 |
| 7* | −1468.4269 | 0.0414 | | |
| 8 | 294.7299 | 10.2332 | 1.77252 | 49.6 |
| 9 | −31.3387 | 0.4502 | | |
| 10 | 35.3904 | 6.9074 | 1.71300 | 53.9 |
| 11 | 32.0783 | | | | f = 100.00   L = 89.352   $F_{NO}$ = 3.30   2ω = 51.9°

Condition (1) value: L/f = 0.894
Condition (2) value: $f_F/f$ = 3.260
Condition (3) value: $f_2/f$ = 0.638
Condition (4) value: $f_4/f$ = 0.372
Condition (5) value: $R_2/f$ = 0.320
Condition (6) value: $R_{11}/f$ = 0.321
Condition (7) value: $D_2/f$ = 0.033
Condition (8) value: $\upsilon_1$ = 59.0

Those surfaces with a * to the right of the surface number in Table 5 above are aspheric, having a shape defined by Equation (A) above. The aspheric coefficients for these surfaces are set forth in Table 6 below.

TABLE 6

| # | C | K | $A_4$ | $A_6$ | $A_8$ | $A_{10}$ |
|---|---|---|---|---|---|---|
| 3 | 0.0345667 | 0.765968 | $1.1870 \times 10^{-7}$ | $-9.4358 \times 10^{-12}$ | $1.2098 \times 10^{-14}$ | $3.0603 \times 10^{-19}$ |
| 4 | 0.0029072 | 0.961857 | $-6.0514 \times 10^{-7}$ | $-1.5922 \times 10^{-10}$ | $-2.6199 \times 10^{-15}$ | $8.9792 \times 10^{-20}$ |
| 6 | −0.0412548 | 1.417510 | $-2.2214 \times 10^{-7}$ | $-4.2324 \times 10^{-10}$ | $5.3819 \times 10^{-15}$ | $1.2619 \times 10^{-19}$ |
| 7 | −0.0006810 | 1.079966 | $2.4837 \times 10^{-6}$ | $-4.2395 \times 10^{-10}$ | $-2.8358 \times 10^{-15}$ | $9.6267 \times 10^{-19}$ |

As is apparent from comparing the values in the bottom portion of Table 5 with Conditions (1)–(8) above, each condition is satisfied by the standard photographic lens of Embodiment 3.

Figure 4A:
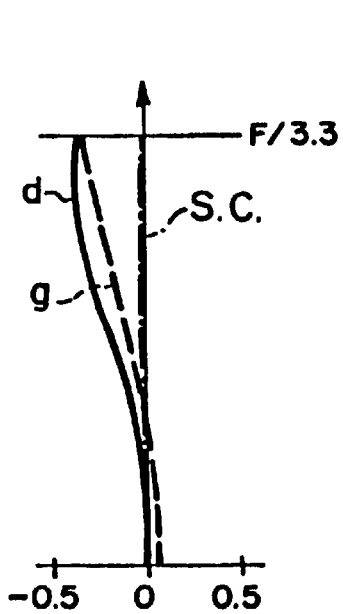
FIGS. 4A–4C show the spherical aberration, curvature of field, and distortion, respectively, of Embodiment 3 of the present invention.
Figure 4B:
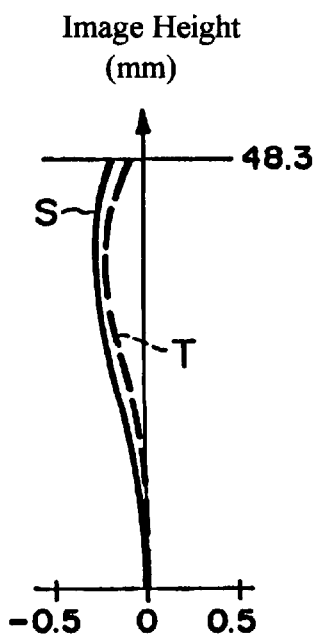
Figure 4C:
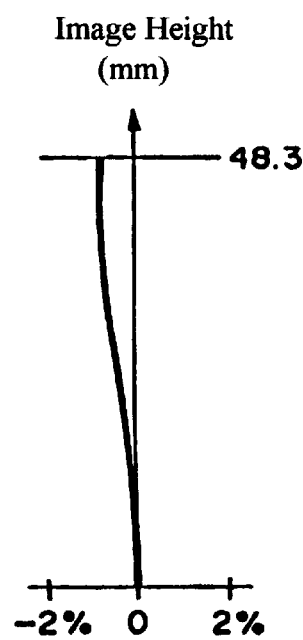

FIGS. 4A–4C show the spherical aberration (in mm), curvature of field (in mm), and distortion, respectively, of the standard photographic lens of Embodiment 3. FIG. 4A shows the spherical aberration for both the d and g lines, and also illustrates the Sine Condition S.C. In FIG. 4B, the curvature of field is illustrated for both the sagittal S and tangential T image planes. As is apparent from these figures, each of the aberrations is favorably corrected for this embodiment.

Embodiment 4

Table 7 below lists the surface number # in order from the object side, the radius of curvature R (in mm) of each surface, the on-axis spacing D (in mm) between surfaces, as well as the index of refraction $N_d$ and Abbe number $\upsilon_d$ (both at the d line) of each optical element of Embodiment 4. In the middle portion of the table are listed the focal length f of the standard photographic lens (normalized to 100 mm), the back focus L, the $F_{NO}$, and image angle 2ω of the standard photographic lens of this embodiment. In the bottom portion of the table are listed the values corresponding to Conditions (1)–(8).

TABLE 7

| # | R | D | $N_d$ | $\upsilon_d$ |
|---|---|---|---|---|
| 1 | 178.2976 | 2.5730 | 1.51823 | 59.0 |
| 2 | 33.1904 | 4.6789 | | |
| 3* | 29.5255 | 10.0729 | 1.49023 | 57.6 |
| 4* | 239.8455 | 24.5198 | | |
| 5 | ∞ (stop) | 12.8646 | | |
| 6* | −24.3565 | 2.7793 | 1.58364 | 30.3 |
| 7* | −214.4481 | 0.0417 | | |
| 8 | 380.3019 | 10.2916 | 1.71300 | 53.9 |
| 9 | −30.7790 | 0.4528 | | |
| 10 | 39.2748 | 9.7256 | 1.83400 | 37.2 |
| 11 | 34.0952 | | | | f = 100.00   L = 87.037   $F_{NO}$ = 3.30   2ω = 52.1°

Condition (1) value: L/f = 0.870
Condition (2) value: $f_F/f$ = 3.590
Condition (3) value: $f_2/f$ = 0.676
Condition (4) value: $f_4/f$ = 0.404
Condition (5) value: $R_2/f$ = 0.332
Condition (6) value: $R_{11}/f$ = 0.341
Condition (7) value: $D_2/f$ = 0.047
Condition (8) value: $\upsilon_1$ = 59.0

Those surfaces with a * to the right of the surface number in Table 7 above are aspheric, having a shape defined by Equation (A) above. The aspheric coefficients for these surfaces are set forth in Table 8 below.

TABLE 8

| # | C | K | $A_4$ | $A_6$ | $A_8$ | $A_{10}$ |
|---|---|---|---|---|---|---|
| 3 | 0.0338690 | 0.781823 | $5.2780 \times 10^{-8}$ | $-6.4942 \times 10^{-11}$ | $1.1524 \times 10^{-14}$ | $3.1907 \times 10^{-19}$ |
| 4 | 0.0041694 | 0.962093 | $-4.8155 \times 10^{-7}$ | $-1.8429 \times 10^{-10}$ | $-4.6357 \times 10^{-15}$ | $2.3947 \times 10^{-20}$ |
| 6 | -0.0410568 | 1.427746 | $4.1511 \times 10^{-7}$ | $-4.2052 \times 10^{-10}$ | $4.9474 \times 10^{-15}$ | $1.1689 \times 10^{-19}$ |
| 7 | -0.0046631 | 1.079983 | $3.1771 \times 10^{-6}$ | $-3.6556 \times 10^{-10}$ | $-2.1068 \times 10^{-15}$ | $9.2389 \times 10^{-19}$ |

As is apparent from comparing the values in the bottom portion of Table 7 with Conditions (1)–(8) above, each condition is satisfied by the standard photographic lens of Embodiment 4.

Figure 5A:
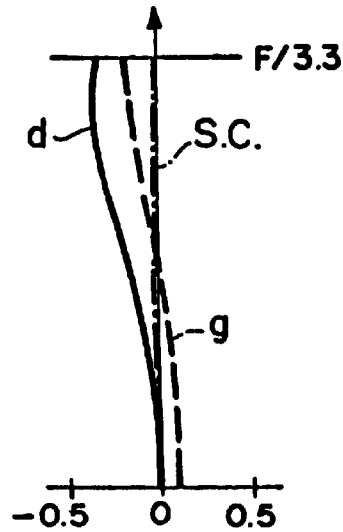
FIGS. 5A–5C show the spherical aberration, curvature of field, and distortion, respectively, of Embodiment 4 of the present invention.
Figure 5B:
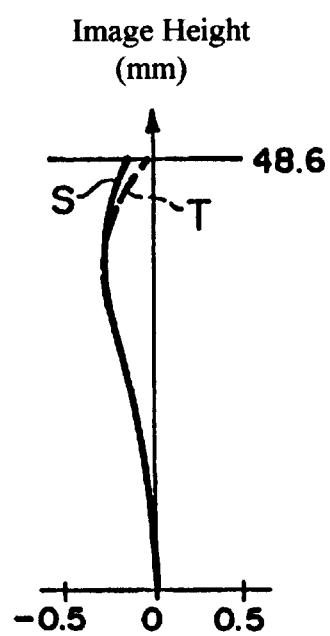
Figure 5C:
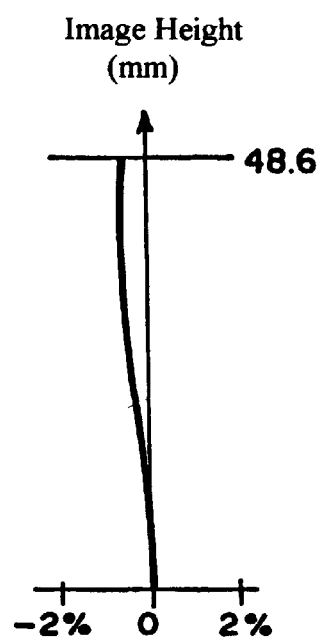

FIGS. 5A–5C show the spherical aberration (in mm), curvature of field (in mm), and distortion, respectively, of the standard photographic lens of Embodiment 4. FIG. 5A shows the spherical aberration for both the d and g lines, and also illustrates the Sine Condition S.C. In FIG. 5B, the curvature of field is illustrated for both the sagittal S and tangential T image planes. As is apparent from these figures, each of the aberrations is favorably corrected for this embodiment.

The invention being thus described, it will be obvious that the same may be varied in many ways. For example, the radii of curvature R and surface spacings D may be readily scaled to obtain a photographic lens of a different focal length. In addition, different optical materials may be used for the lens elements and the appropriate radii of curvature and surface spacings selected in accordance with the teachings of the present invention. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A standard photographic lens comprising, in order from the object side, a front lens group, a diaphragm to regulate the brightness of the image, and a rear lens group, wherein the front lens group is formed of a first lens element of negative refractive power and meniscus shape, with its convex surface on the object side, and a second lens element of positive refractive power and meniscus shape, with its convex surface on the object side;

the rear lens group is formed of a third lens element of negative refractive power with a concave surface on the object side, a fourth lens element of positive refractive power with a convex surface on the image side, and a fifth lens element of meniscus shape with its concave surface on the image side, and the following Conditions (1)–(8) are satisfied:

| | |
|---|---|
| $0.75 < L/f < 1.0$ | Condition (1) |
| $2.70 < f_F/f < 4.0$ | Condition (2) |
| $0.60 < f_2/f < 1.0$ | Condition (3) |
| $0.33 < f_4/f < 0.43$ | Condition (4) |
| $0.25 < R_2/f < 0.40$ | Condition (5) |
| $0.25 < R_{11}/f < 0.45$ | Condition (6) |
| $0.02 < D_2/f < 0.12$ | Condition (7) |
| $v_1 > 50.0$ | Condition (8) | where

L is the back focus, f is the focal length of the standard photographic lens, $f_F$ is the focal length of the front lens group, $f_2$ is the focal length of the second lens element, in order from the object side, $f_4$ is the focal length of the fourth lens element, in order from the object side, $R_2$ is the radius of curvature of the image-side surface of the first lens element, in order from the object side, $R_{11}$ is the radius of curvature of the image-side surface of the fifth lens element, in order from the object side, $D_2$ is the on-axis spacing between the first lens element and the second lens element, in order from the object side, and $v_1$ is the Abbe number of the optical material of the first lens element.

2. The standard photographic lens according to claim 1, wherein said third lens element is made of organic material and at least one surface thereof is aspheric.

3. The standard photographic lens according to claim 2, wherein the second lens element is made of organic material.

4. The standard photographic lens according to claim 3, wherein at least one surface of the second lens element is aspheric.

* * * * *